US008515250B2

(12) United States Patent
Sakaniwa (10) Patent No.: US 8,515,250 B2
(45) Date of Patent: Aug. 20, 2013

(54) VIDEO RECORDING DEVICE, VIDEO REPRODUCTION DEVICE, AND METHOD THEREOF

(75) Inventor: Katsuyuki Sakaniwa, Hyogo (JP)

(73) Assignee: Panasonic Corporation, Osaka (JP)

(*) Notice: Subject to any disclaimer, the term of this patent is extended or adjusted under 35 U.S.C. 154(b) by 198 days.

(21) Appl. No.: 13/054,246

(22) PCT Filed: Jun. 17, 2009

(86) PCT No.: PCT/JP2009/002762
§ 371 (c)(1),
(2), (4) Date: Jan. 14, 2011

(87) PCT Pub. No.: WO2010/007727
PCT Pub. Date: Jan. 21, 2010

(65) Prior Publication Data
US 2011/0110648 A1    May 12, 2011

(30) Foreign Application Priority Data
Jul. 17, 2008    (JP) .................................. 2008-185943

(51) Int. Cl.
*H04N 9/80*    (2006.01)

(52) U.S. Cl.
USPC ....................................................... 386/248

(58) Field of Classification Search
USPC .................. 386/239, 248, 343, 344, 353, 357
See application file for complete search history.

(56) References Cited

U.S. PATENT DOCUMENTS

| | | | | |
|---|---|---|---|---|
| 4,633,332 A | * | 12/1986 | Higurashi et al. ............ | 386/317 |
| 6,104,861 A | * | 8/2000 | Tsukagoshi .................... | 386/241 |
| 6,553,180 B1 | * | 4/2003 | Kikuchi et al. ............... | 386/241 |
| 2003/0228131 A1 | | 12/2003 | Miyazawa | |
| 2005/0013583 A1 | * | 1/2005 | Itoh .................................. | 386/1 |
| 2006/0291809 A1 | | 12/2006 | Yamakawi | |

FOREIGN PATENT DOCUMENTS

| | | |
|---|---|---|
| JP | 8-98146 | 4/1996 |
| JP | 11-95778 | 4/1999 |
| JP | 11-120698 | 4/1999 |
| JP | 2001-128171 | 5/2001 |
| JP | 2004-15485 | 1/2004 |
| JP | 2004-78704 | 3/2004 |
| WO | 2005/033924 | 4/2005 |

OTHER PUBLICATIONS

International Preliminary Report on Patentability (translation) and Written Opinion of the International Searching Authority issued Feb. 8, 2011 in corresponding International (PCT) Application No. PCT/JP2009/002762.

International Search Report issued Oct. 6, 2009 in International (PCT) Application No. PCT/JP2009/002762.

* cited by examiner

*Primary Examiner* — Tat Chio
(74) *Attorney, Agent, or Firm* — Wenderoth, Lind & Ponack, L.L.P.

(57) ABSTRACT

A video reproduction apparatus includes audio data reading unit for reading audio data in a second file; video data reading units for reading video data in a first file; audio decoding unit for generating an audio signal from the audio data read by the audio data reading unit; video decoding unit for decoding the demultiplexed video data; and read controlling unit for controlling the audio data reading unit and the video data reading unit. The read controlling unit reads the first file using a band other than a band required to read the second file, and instructs to output skipped video data.

6 Claims, 4 Drawing Sheets

VIDEO RECORDING DEVICE, VIDEO REPRODUCTION DEVICE, AND METHOD THEREOF

TECHNICAL FIELD

The present invention relates to a video recording and reproduction apparatus that records multiplexed data, in which video data and audio data are multiplexed, and audio data on a disk and reproduces video and audio from the data recorded on the disk, as well as a method thereof.

BACKGROUND ART

In recent years, due to the proliferation of nonlinear editing equipment and the emergence of camera recorders using optical disks, hard disks, or semiconductor memories, there have been increasing opportunities to make video and audio data into files to store the files in recording media and perform video editing.

The data made into files is read and written through software called a file system. The file system has a mechanism to manage as one file data stored in physically distanced positions on a recording medium. When such scattered data is stored on a hard disk or an optical disk, read head seeks and rotation. waits occur upon reading the file. These phenomena reduce the read speed, and it is a serious problem for video reproduction, etc., which require real-time performance.

Hence, in nonlinear editing equipment, multiple hard disks that store video are configured as RAID (Redundant Arrays of Independent Disks) to reduce the influence of head seeks and parallelize readings in order to improve the read speed, ensuring real-time performance and improving responsiveness.

Implementing hard disks of nonlinear editing equipment as RAID is operationally possible, but taking out and using the hard disks implemented as RAID at a shooting site has many problems in terms of cost and size. In view of this, Patent Document 1 provides a mechanism in which reading and writing from/to a file are performed adopting a size larger than a size (cluster) that is managed by a file system as a unit of reading and writing, to reduce the number of head seeks, thereby enabling to reproduce video in real time without using RAID.
Prior Art Document
Patent Document
 Patent Document 1: JP 2004-78704 A.

SUMMARY OF THE INVENTION

Problems to be Solved by the Invention

One of the advantages of RAID is the improvement in the speed of random. access. In video editing, a large amount of time is spent in operations for searching for portions to be used by special reproduction by jog, shuttle, etc. Smoothly performing such operations is as important as performing real-time reproduction. Implementation of RAID is one solution to this problem. Since random access by special reproduction causes seeks and rotation waits on a disk, even with the scheme of Patent Document 1, a reduction in read speed is caused and it is highly likely that video and audio are reproduced choppily. In addition, not only at special reproduction but also at 1× reproduction, when the hard disk performance is low, video and audio may be reproduced choppily.

When video and audio are reproduced choppily, a user has an uncomfortable feeling or an annoying feeling about the choppy audio rather than the choppy video. This is because, in special reproduction, video has a feature that it is outputted discretely, whereas audio has a feature that it is outputted continuously.

In view of the above-described. problems, an object of the present invention is to provide a mechanism to reproduce video and audio without being choppy, when performing special reproduction or 1× reproduction on video and audio files recorded on a disk with insufficient performance.

Means for Solving the Problems

A video reproduction apparatus according to the present invention reads, from a recording medium that stores a first file having recorded therein video data and a second file having audio data recorded in a physically continuous recording area, the first file and the second file and reproduces video and audio. The video reproduction apparatus includes: audio data reading unit for reading the audio data in the second file from the recording medium; video data reading unit for reading the video data in the first file from the recording medium; read controlling unit for controlling read operations of the audio data reading unit and the video data reading unit; audio decoding unit for generating an audio signal from the audio data read by the audio data reading unit; and video decoding unit for generating a video signal from the video data read by the video data reading unit. The read controlling unit controls the video data reading unit to read the video data in the first file from the recording medium using a band other than a band required to read the audio data in the second file.

The video reproduction apparatus may further include an audio buffer that stores the audio data read by the audio data reading unit, and the read controlling unit may control the audio data reading unit to read the second file from the recording medium while a free space in the audio buffer is greater than or equal to a predetermined value, and may read the first file from the recording medium when the free space in the audio buffer is less than the predetermined value.

The video reproduction apparatus may further include a video buffer that stores the video data obtained by the video data reading unit, and the read controlling unit may perform read performance evaluation based on an amount of data stored in the video buffer, and may control the video data reading unit to output video data that is obtained at last reading to the video buffer when the amount of data is smaller than a predetermined amount.

In the video reproduction apparatus, the video data may be recorded to be multiplexed with the audio data in the first file, and the video data reading unit may read the video data and the audio data from the first file, the video reproduction apparatus may be capable of reproducing video and audio from the recording medium at mx speed (m≦1), when the video and the audio are reproduced at mx speed, the read controlling unit may control the audio data reading unit not to read the second file from the recording medium, and may control the video data reading unit to read the first file from the recording medium, the audio decoding unit may generate an audio signal from the audio data obtained by the video data reading unit, and the video decoding unit may generate a video signal from the video data obtained by the video data reading unit.

A video recording apparatus according to the present invention includes: encoding unit for encoding a video signal and an audio signal that are inputted from an external source to generate video data and audio data; multiplexed data writing unit for multiplexing the video data and the audio data to generate multiplexed data, and recording the multiplexed data in a recording medium as a single multiplexed file; and audio data writing unit for recording, as an audio file, the encoded audio data in a physically continuous area of the recording medium.

A video reproduction method according to the present invention is to read, from a recording medium that stores a first file having recorded therein video data and a second file having audio data recorded in a physically continuous recording area, the first file and the second file and reproduce video and audio. The video reproduction method includes: an audio data reading step of reading the audio data in the second file from the recording medium; a video data reading step of reading the video data in the first file from the recording medium; a read controlling step of controlling read operations in the audio data reading step and the video data reading step; an audio decoding step of generating an audio signal from the audio data read in the audio data reading step; and a video decoding step of generating a video signal from video data read in the video data reading step. The read controlling step controls the video data reading step to read the video data in the first file from the recording medium using a band other than a band required to read the audio data in the second file.

Effect of the Invention

In reproduction of audio and video files saved on a disk, in a case of normal reproduction or low-speed reproduction, by reading an audio and video multiplexed file arranged in a continuous area on the disk, frame dropping is suppressed, thereby enabling to improve real-time performance. Further, when high-speed reproduction or reading cannot catch up, by reading an audio file arranged in a continuous area on the disk on a priority basis, sound can be prevented from being chopped and video searchability can be improved.

DETAILED DESCRIPTION OF THE INVENTION

An embodiment of the present invention will be described below with reference to the drawings. In the present embodiment, a case will be described in which a video bit rate is 120,000 bytes/frame, a frame rate is 30 frames/second, an audio sampling rate is 48000 Hz, the number of bytes per sample is 2, and the number of channels is 4.

[Configuration of a Moving Image Recording and Reproduction Apparatus]

Figure 1:
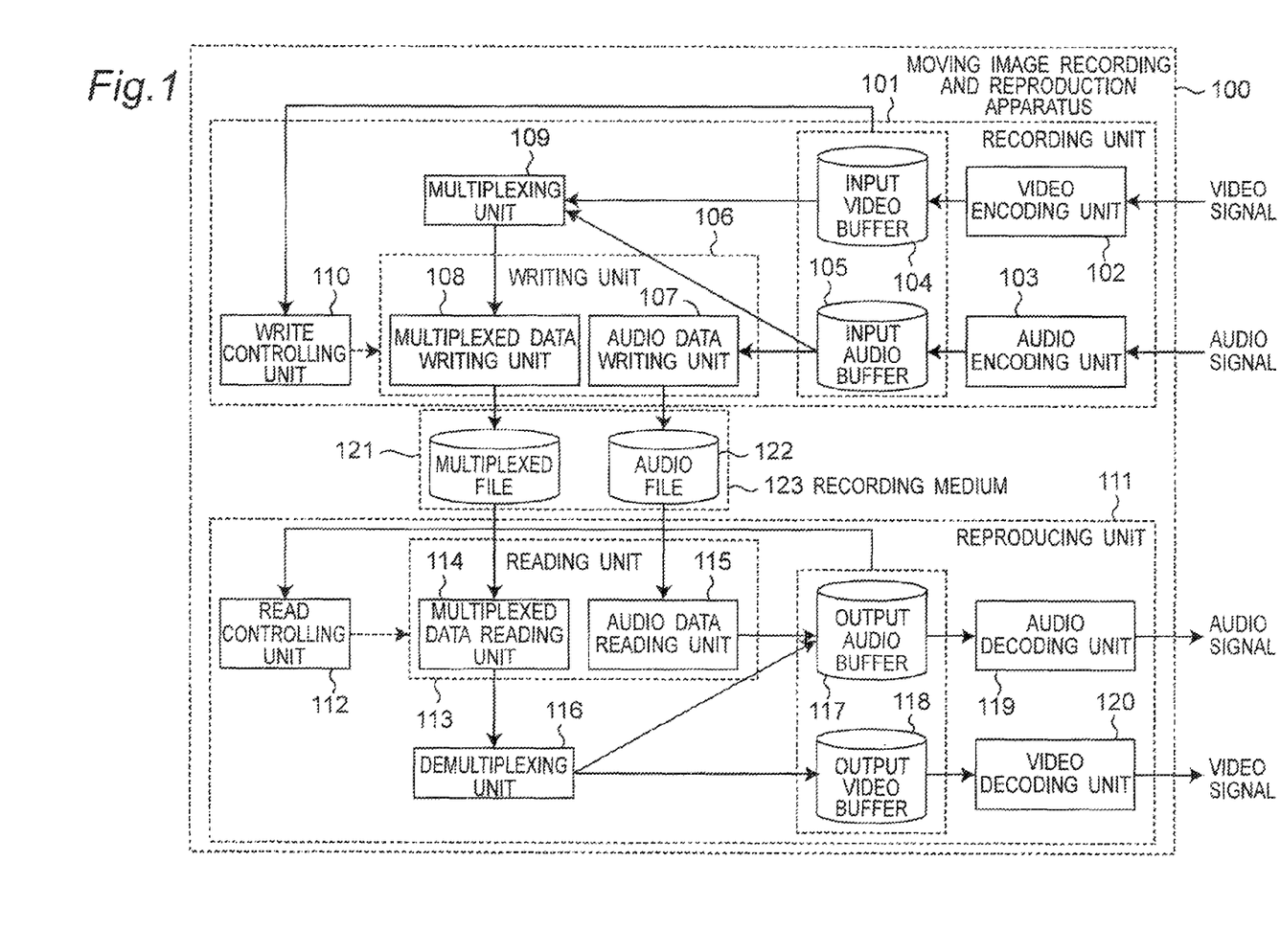
FIG. 1 is a configuration diagram of a moving image recording and reproduction apparatus according to an embodiment of the present invention.

FIG. 1 shows a configuration of a moving image recording and reproduction apparatus 100 according to the embodiment of the present invention. The moving image recording and reproduction apparatus 100 is configured by a recording unit 101 that encodes inputted video and audio signals and records the video and audio signals in a recording medium 123; and a reproducing unit 111 that reproduces data recorded in the recording medium 123. Specifically, the recording unit 101 encodes a video signal and an audio signal inputted from an external source into video data and audio data, multiplexes the video data and the audio data to generate multiplexed data, and records the multiplexed data and the audio data in the recording medium 123 as a multiplexed file 121 and an audio file 122, respectively. The reproducing unit 111 reads the multiplexed data and the audio data which are recorded as the multiplexed file 121 and the audio file 122 from the recording medium 123, demultiplexes the multiplexed data into video data and audio data, and further decodes the demultiplexed video data and audio data into a video signal and an audio signal, respectively, to output the video signal and the audio signal. In this case, the multiplexed file 121 and the audio file 122 are fixed-length files. In the present embodiment, the recording medium 123 is a hard disk, but may be an optical disk, a magneto-optical disk, etc.

First, the recording unit 101 will be described in detail. A video encoding unit 102 encodes a video signal inputted from an external source into video data, and outputs the video data to an input video buffer 104. An audio encoding unit 103 encodes an audio signal inputted from an external source into audio data, and outputs the audio data to an input audio buffer 105.

A multiplexing unit 109 receives video data for one frame (120,000 bytes) accumulated in the input video buffer 104 and audio data for one frame (12,800 bytes=48000 Hz 30 frames/second×2 bytes/sample×4 channels) accumulated in the input audio buffer 105, and multiplexes the audio data and the video data for one frame to generate multiplexed data.

A writing unit 106 is configured by an audio data writing unit 107 and a multiplexed data writing unit 108. The audio data writing unit 107 records audio data accumulated in the input audio buffer 105, in the recording medium 123 as the audio file 122. The multiplexed data writing unit 108 receives multiplexed data for one frame from the multiplexing unit 109 and records the inputted multiplexed data in the recording medium 123 as the multiplexed file 121.

The input video buffer 104 and the input audio buffer 105 are ring buffers. When the video encoding unit 102 outputs video data to the input video buffer 104, the input video buffer 104 moves a write pointer on the ring buffer one step forward. When the audio encoding unit 103 outputs audio data to the input audio buffer 105, the input audio buffer 105 moves a write pointer on the ring buffer one step forward. Furthermore, when the multiplexing unit 109 reads video data from the input video buffer 104, the input video buffer 104 moves the read pointer on the ring buffer one step forward. When both the audio data writing unit 107 and the multiplexing unit 109 read audio data from the input audio buffer 105, the input audio buffer 105 moves the read pointer on the ring buffer one step forward.

A write controlling unit 110 periodically checks whether data for one frame or more is accumulated in the input video buffer 104 and the input audio buffer 105. If accumulated, then the write controlling unit 110 provides a write instruction to the writing unit 106.

In the present embodiment, the write controlling unit 110 checks the amounts of data in the input video buffer 104 and the input audio buffer 105 every 1/30 second. If it is found that data for one frame or more is accumulated, then the write controlling unit 110 sends a write instruction to the multiplexed data writing unit 108. The multiplexed data writing unit 108 having received the write instruction for the first time first reserves a physical continuous area on the disk. In the present embodiment, an area of 5 MB (≈120,000 bytes×40 frames) equivalent to about 40 frames is reserved. Thereafter, the multiplexed data writing unit 108 receives multiplexed data for one frame from the multiplexing unit 109 and writes the inputted multiplexed data to the recording medium 123 as the multiplexed file 121. After this, every time the multiplexed data writing unit 108 receives an instruction from the write controlling unit 110, the multiplexed data writing unit 108 receives multiplexed data for one frame from the multiplexing unit 109 and sequentially and additionally writes the inputted data to the recording medium 123 as the multiplexed file 121.

When the multiplexed data writing unit 108 is done with writing the 5 MB continuous area, the write controlling unit 110 sends a write instruction to the audio data writing unit 107. The audio data writing unit 107 reserves a physical continuous area which is an area of 512 KB (≈12,800×40 frames) equivalent to the amount of data for about 40 frames, on the disk. The audio data writing unit 107 writes audio data of 512 KB accumulated in the input audio buffer 105, to the recording medium 123 as the audio file 122.

Then, the write controlling unit 110 sends a write instruction to the multiplexed data writing unit 108. The multiplexed data writing unit 108 newly reserves a continuous area of 5 MB, and sequentially and additionally writes multiplexed data to the recording medium 123 as the multiplexed file 121 every time receiving an instruction from the write controlling unit 110.

Figure 2:
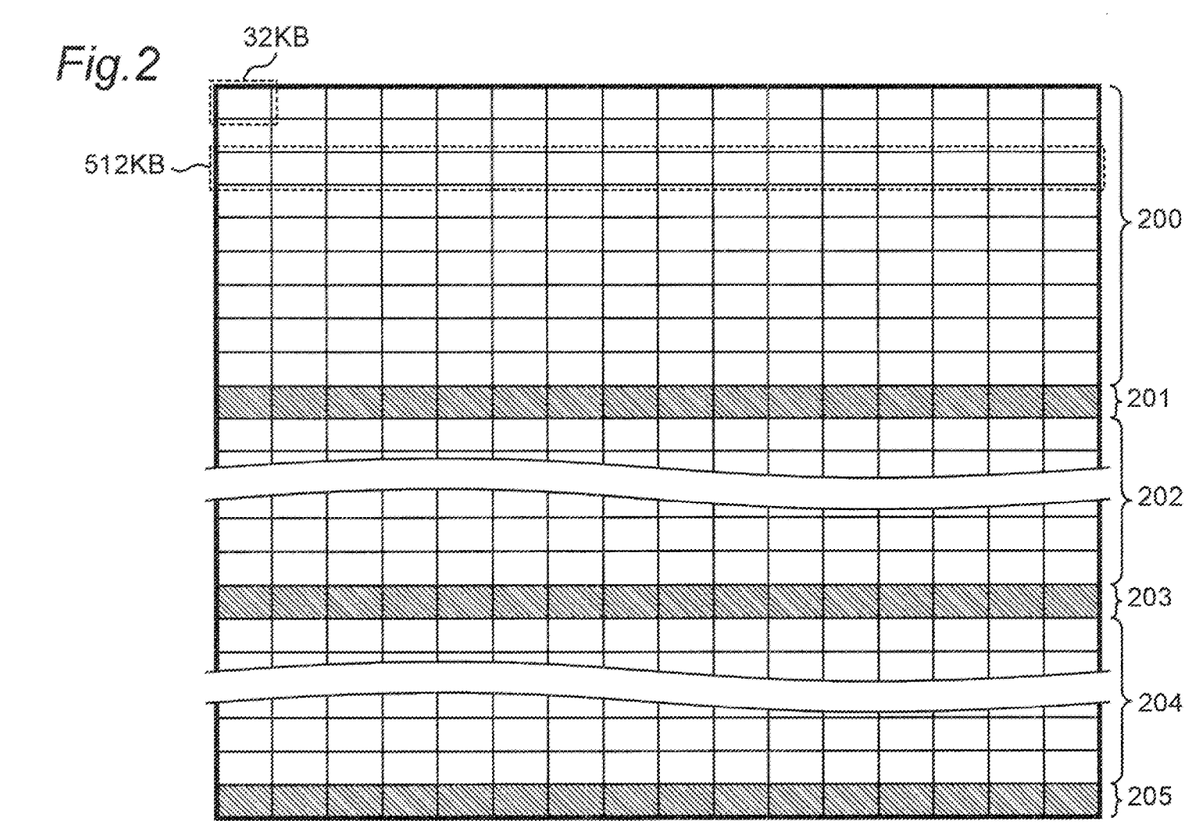
FIG. 2 is a physical arrangement diagram of a multiplexed file and an audio file on a disk in FIG. 1.

The files written in this manner have a physical arrangement such as that shown in FIG. 2. One square indicates a 32 KB area, and one row indicates a 512 (32×16) KB area. First, from the top, multiplexed data is written to a 5 MB area 200, and audio data is written to a 512 KB area 201 following the area 200. Likewise, multiplexed data is written to a 5 MB area 202 following the area 201, and audio data is written to a 512 KB area 203 following the area 202. By repeating this, the area 200, the area 202, and an area 204 turn out to be areas (5 MB each) in which the contents of the multiplexed file 121 are written, and the area 201, the area 203, and an area 205 turn out to be areas (512 KB each) in which the contents of the audio file 122 are written. The data in the multiplexed file 121 is written in the order of the area 200→the area 202→the area 204, and the data in the audio file 122 is written in the order of the area 201→the area 203 the area 205.

Next, the reproducing unit 111 will be described in detail. The reproducing unit 111 reads files whose data is arranged in the manner shown in FIG. 2, from the recording medium 123 and reproduces the data. In addition, the reproducing unit 111 outputs video and audio according to a reproduction speed set by a user.

A read controlling unit 112 computes a read position according to a reproduction speed specified by the user and the amounts of data respectively accumulated in an output audio buffer 117 and an output video buffer 118. The read controlling unit 112 instructs a reading unit 113 to read data from the computed position in the multiplexed. file 121 or the audio file 122.

The reading unit 113 is configured by a multiplexed data reading unit 114 and an audio data reading unit 115. The multiplexed data reading unit 114 reads multiplexed data for one frame in the multiplexed file 121 from the recording medium 123, and outputs the read multiplexed data for one frame to a demultiplexing unit 116. The demultiplexing unit 116 demultiplexes data multiplexed on a frame-by-frame basis into video data and audio data, and outputs the demultiplexed video data and audio data to the output video buffer 118 and the output audio buffer 117, respectively. The audio data reading unit 115 reads audio data in the audio file 122 from the recording medium 123, and outputs the read audio data to the output audio buffer 117.

Synchronization between the audio data and the video data is achieved when outputted from the output audio buffer 117 and the output video buffer 118. An audio decoding unit 119 decodes audio data stored in the output audio buffer 117 into an audio signal, and outputs the audio signal to an external source according to a reproduction speed set by the user. For example, in a case of 3× speed, the audio signal is modulated by 3× speed and then outputted. A video decoding unit 120 reads video data stored in the output video buffer 118 every 1/30 second, decodes the read video data into a video signal, and outputs the video signal to an external source.

As with the input video buffer 104 and the input audio buffer 105, the output audio buffer 117 and the output video buffer 118 are also ring buffers. When either the audio reading unit 113 or the demultiplexing unit 116 outputs audio data to the output audio buffer 117, the output audio buffer 117 moves a write pointer on the ring buffer one step forward. In addition, when the demultiplexing unit 116 outputs video data to the output video buffer 118, the output video buffer 118 moves a write pointer on the ring buffer one step forward. Furthermore, when the audio decoding unit 119 reads audio data in the output audio buffer 117, the output audio buffer 117 moves a read pointer on the ring buffer one step forward. Furthermore, when the video decoding unit 120 reads video data in the output video buffer 118, the output video buffer 118 moves a read pointer on the ring buffer one step forward.

[Operation of the Moving Image Recording and Reproduction Apparatus]

First, the operation (reproduction process) of the reproducing unit 111 at 1× (normal) reproduction or at low-speed reproduction will be described. At this time, the reproducing unit 111 performs a process of reading only the multiplexed file 121 but not reading the audio file 122. When the read controlling unit 112 recognizes that the reproduction speed is 1× or lower, the read controlling unit 112 sends a read request to the multiplexed data reading unit 124. After this, the read controlling unit 112 continues to send a read request to the multiplexed data reading unit 114 until there is no more free space left in the output audio buffer 117 and the output video buffer 118. After the output audio buffer 117 and the output video buffer 118 have no more free space left, the read controlling unit 112 checks on an available space in the output audio buffer 117 and the output video buffer 118 every 1/30 second. If there is an available space, then the read controlling unit 112 sends a read request to the multiplexed data reading unit 114 until there is no more free space left in the buffers. The multiplexed data reading unit 114 starts reading of multiplexed data from the top of the area 200 in FIG. 2. Every time the multiplexed data reading unit 114 receives a request, the multiplexed data reading unit 114 reads multiplexed data in the multiplexed file 121 (the area 200, the area 202, and the area 204 in FIG. 2) frame by frame.

In FIG. 2, reading of the hard disk is performed in the order of the area 200→the area 202→the area 204. When reading the last data in the area 200→the first data in the area 202 and the last data in the area 202→the first data in the area 204, processes of skipping the area 201 and the area 203 are performed respectively. In the skipping processes, a head seek occurs. However, the frequency of the occurrence of a head seek is only once every 40 frame time (about 1.3 seconds=40 frames 30 frames/second), and at all other times continuous reading is assured and thus the disk performance can be sufficiently brought out.

Figure 3:
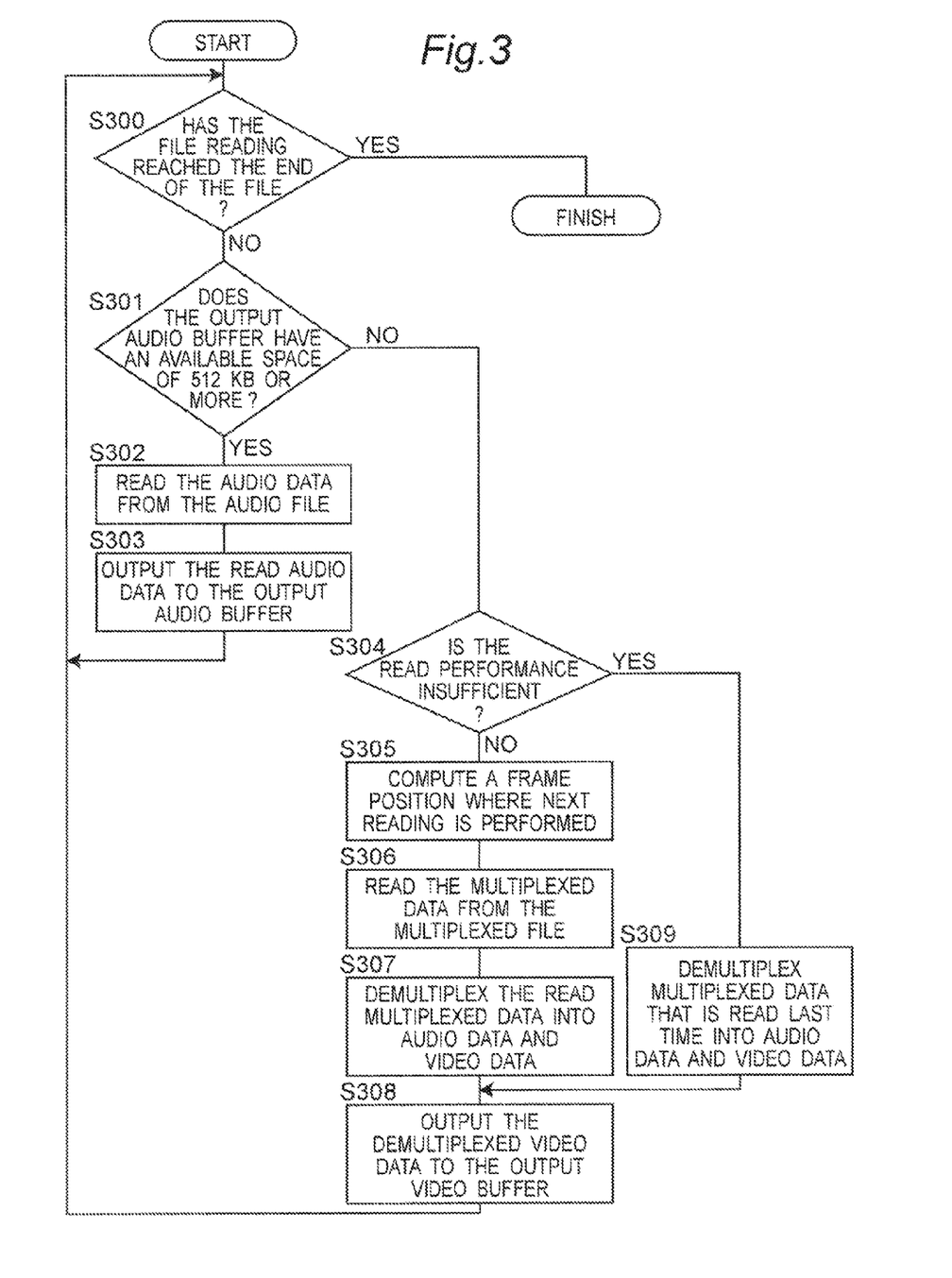
FIG. 3 is a flowchart of operations performed by a reproducing unit of the moving image recording and reproduction apparatus according to the embodiment of the present invention.

Next, the operation of the reproducing unit 111 at 3× (high speed) reproduction will be described. At this time, the reproducing unit 111 performs a process of reading both the multiplexed file 121 and the audio file 122. FIG. 3 shows a flowchart of operations performed by the reproducing unit of the moving image recording and reproduction apparatus of the embodiment of the present invention. The output audio buffer 117 in the present embodiment is 1 MB in size.

The read controlling unit 112 determines whether the file reading has reached the end of the file (end determination S300). If the file reading has reached the end of the file (Yes at S300), then since there is no more data to be read, the read controlling unit 112 ends the read process.

On the other hand, if the file reading has not reached the end of the file (No at S300), then the read controlling unit 112 obtains an availability state of the output audio buffer 117 to determine whether the output audio buffer 117 has an available space of 512 KB or more (audio buffer available space determination S301). 512 KB is the size of one continuous audio arrangement area in the audio file. If the output audio buffer 117 has an available space of 512 KB or more (Yes at S301), then the audio data reading unit 115 reads the audio data in the audio file from the recording medium 123 (audio file read process S302) and outputs the read audio data in the audio file to the output audio buffer 117 (audio data output process S303). Processing returns to step S300 and the process is repeated. That is, reading of audio data is repeated until the output audio buffer 117 is filled up.

If the output audio buffer 117 has an available space of only less than 512 KB (No at S301), then the reproducing unit 111 determines whether there is a possibility that the amount of buffer of the output video buffer 118 ends up becoming zero, causing underrun and accordingly the reproduction is stopped, i.e., whether the read performance is insufficient (performance evaluation determination S304). Specifically, it is considered that, for example, when the number of frames accumulated in the output video buffer 118 is five or less and the number of accumulated data units is decreased over that obtained when the last performance evaluation determination is performed, the read controlling unit 112 determines that the performance is insufficient.

If the read performance is not insufficient (No at S304), then the read controlling unit 112 computes a frame position where next reading is performed, from a frame position where the last reading is performed and the reproduction speed (read frame position computation process S305). The initial value of the frame position is 1. The multiplexed data reading unit 114 reads, from the recording medium 123, multiplexed data in the multiplexed file 121 in the frame position which is determined at read frame position computation process S305 (multiplexed file read process S306). The demultiplexing unit 116 demultiplexes the read multiplexed data into audio data and video data (video data demultiplexing process S307) and outputs the demultiplexed video data to the output video buffer 118 (video data output process S308). If the read performance is insufficient (Yes at S304), then the multiplexed data reading unit 114 does not read new multiplexed data, and the demultiplexing unit 116 demultiplexes multiplexed data that is read last time into audio data and video data (hold process S309), and outputs the demultiplexed video data to the output video buffer 118 (video data output process S308).

Now, described is a specific example of a case of 3× reproduction with the read performance not being insufficient. When 3× reproduction starts, first, at end determination S300, it is determined that it is not the end of the file. Then, at audio buffer available space determination S301, it is determined that the output audio buffer 117 has an available space of 512 KB or more. At audio file read process S302, first, the read controlling unit 112 instructs the audio data reading unit 115 to transfer audio data of 512 KB. The audio data reading unit 115 reads audio data in the area 201 (512 KB) in FIG. 2. At audio data output: process S303, the audio data reading unit 115 outputs (transfers) the read audio data to the output audio buffer 117.

Again, at end determination S300, it is determined that it is not the end of the file. Then, at audio buffer available space determination S301, it is determined that the output audio buffer 117 still has an available space of 512 KB or more. Furthermore, at audio file read process S302, the read controlling unit 112 instructs the audio data reading unit 115 to transfer audio data of 512 KB. The audio data reading unit 115 reads audio data in the area 203 (512 KB) in FIG. 2. At audio data output process S303, the audio data reading unit 115 outputs the read audio data to the output audio buffer 117.

Again, at end determination S300, it is determined that it is not the end of the file. Then, at audio buffer available space determination S301, it is determined that the output audio buffer 117 is filled up. Furthermore, when it is determined at performance evaluation determination S304 that the performance is not insufficient, at read frame position computation process S305 the read controlling unit 112 sets an initial value of 1 to the read frame position. Then, at multiplexed file read process S306, the read controlling unit 112 instructs the multiplexed data reading unit 114 to read multiplexed data for the first frame. The multiplexed data reading unit 114 reads multiplexed data for the first frame in the multiplexed file 121, and outputs the read multiplexed data to the demultiplexing unit 116. At video data demultiplexing process S307, the demultiplexing unit 116 demultiplexes the multiplexed data into video data and audio data. At video data output process S308, the demultiplexing unit 116 outputs (transfers) the demultiplexed video data to the output video buffer 118. At this time, since the audio data has already been transferred to the output audio buffer 117 by the audio data reading unit 115, the demultiplexing unit 116 does not output the audio data to the output audio buffer 117.

When processing proceeds again to end determination S300, audio buffer available space determination S301, and performance evaluation determination S304 and it is determined at performance evaluation determination S304 that the performance is not insufficient, at read frame position computation process S305 the read controlling unit 112 computes a frame position of 4 (=1+3) where next reading is to be performed, from 3× speed which is the reproduction speed and a last transfer frame position of 1. Then, at multiplexed file read process S306, the read controlling unit 112 instructs the multiplexed data reading unit 114 to read multiplexed data for the fourth frame. The multiplexed data reading unit 114 reads multiplexed data for the fourth frame in the multiplexed file 121, and outputs the read multiplexed data to the demultiplexing unit 116. At video data demultiplexing process S307, the demultiplexing unit 116 demultiplexes the multiplexed data into video data and audio data. At video data output process S308, the demultiplexing unit 116 outputs the demultiplexed video data to the output video buffer 118. As with when the first transfer is performed by the demultiplexing unit 116, the demultiplexing unit 116 does not output the audio data to the output audio buffer 117. After this, until the output audio buffer 117 has an available space of 512 KB or more, i.e., until 13 frame (≈40 frames 3× speed) time (about 0.4 seconds=40 frames (3× speed×30 frames/second)) has elapsed, this process (steps S305 to S308) is repeated. Since the read performance is not insufficient, this process is repeated 13 times or more. Namely, video data for 13 frames or more is outputted to the output video buffer 118.

Figure 4:
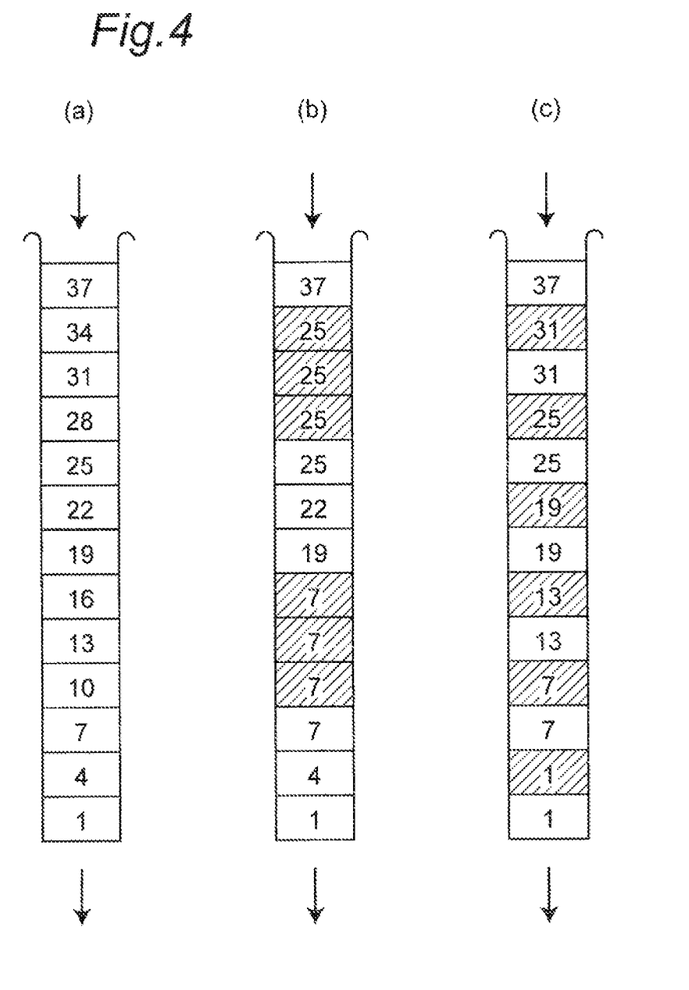
FIGS. 4(a) to 4(c) are diagrams showing states of an output video buffer in FIG. 1 in which video data is accumulated.

FIG. 4(*a*) shows a state of the output video buffer 118 in which video data is accumulated, for when the read performance is not insufficient. Video data for a (3n+1)th frame is stored in turn as follows: video data for the first frame, video data for the fourth frame, video data for the seventh frame, video data for the tenth frame, . . . . The n is an integer greater than or equal to zero.

After 13 frame time has elapsed, an available space of 512 KB is created in the output audio buffer 117, and thus, it is determined at audio buffer available space determination S301 that the output audio buffer 117 has an available space of 512 KB or more. As with when the first transfer is performed by the audio data reading unit 115, at audio file read process S302 the read controlling unit 112 instructs the audio data reading unit 115 to perform next transfer of audio data of 512 KB. The audio data reading unit 115 reads audio data in the area 205 (512 KB) in FIG. 2. At audio data output process S303, the audio data reading unit 115 outputs the read audio data to the output audio buffer 117. In this manner, the above-described process is repeated until it is determined at end termination S300 that it is the end of the file.

Described is a specific example of a case of 3× reproduction with the read performance being insufficient. This description includes only those portions that differ from a case in which the read performance is not insufficient. When it is determined at performance evaluation determination S304 that the performance is insufficient, at hold process S309 the read controlling unit 112 instructs the multiplexed data reading unit 114 to output the same multiplexed data as the last one. The multiplexed data reading unit 114 outputs multiplexed data that is read last time to the demultiplexing unit 116 again, instead of reading multiplexed data in the multiplexed file 121 from the recording medium 123. The demultiplexing unit 116 demultiplexes the multiplexed data that is read last time into video data and audio data. At video data output process S308, the demultiplexing unit 116 outputs the demultiplexed video data to the output video buffer 118. As is the case of the read performance being not insufficient, the demultiplexing unit 116 does not output the audio data to the output audio buffer 117.

FIG. 4(b) shows a state of the output video buffer 118 in which video data is accumulated, for when the read performance is insufficient. A hatched portion indicates a frame for which the demultiplexing unit 116 outputs the same video data as the last one. Video data for the seventh frame is stored instead of video data for the 10th, 13th, and 16th frames shown in FIG. 4(a), and video data for the 25th frame is also stored instead of video data for the 28th, 31st, and 34th frames.

Note that performance evaluation determination may be performed at step S304 such that, as shown in. FIG. 4(c), those frames (hatched portions) for which the demultiplexing unit 116 outputs the same video data as the last one are not continued.

Since the demultiplexing unit 116 outputs (transfers) the same video data as the last one, the same effect as that provided when reproduction is performed at a reduced frame rate is provided. This utilizes a feature that in high-speed video reproduction, even if the frame rate is reduced, a visual difference is difficult to see.

Note that although in the present embodiment only the multiplexed file 121 is read at 1× reproduction or at low-speed reproduction, when reading of audio data and video data is not likely to be performed in time, the read process may be switched to the one such as that shown in FIG. 3, in which both the multiplexed file 121 and the audio file 122 are read.

Note that the present invention is effective without being limited by the video and audio bit rate, frame rate, sampling rate, the number of bytes per sample, the number of channels, and the amount of buffer of the output audio buffer 117 which are described in the present embodiment.

Note that although at hold process S309 in the present embodiment the multiplexed data reading unit 114 transfers the same data as that transferred last time, instead of transferring the same data the multiplexed data reading unit 114 may transfer information indicating that the same data is transferred (hold information), to the output video buffer 118 and the video decoding unit 120 may output the same data by referring to data that is transferred last time.

Note that in the present embodiment the multiplexed file 121 and the audio file 122 are fixed-length files but may be variable-length files.

Note that although in the present embodiment an example of reading, from the recording medium 123 that stores the multiplexed file 121 in which video data and audio data are multiplexed and the audio file 122, the multiplexed file 121 and the audio file is described, instead of the multiplexed file 121, a video file in which only video data is recorded may be used.

When the read performance is insufficient, a moving image recording and reproduction apparatus of the present embodiment reads audio data on a priority basis and outputs, without reading video data, the same video data as the last one. As such, before reproduction fails, by performing a process of suppressing the number of file accesses by reducing the frame rate, even when, for example, reading cannot catch up due to high-speed reproduction, etc., video can be searched without sound chopping, giving an uncomfortable feeling.

In addition, in a case of normal reproduction or low-speed reproduction, since the moving image recording and reproduction. apparatus of the present embodiment reads only a multiplexed file arranged in a continuous area on the disk, frame dropping is suppressed, thereby enabling to improve real-time performance.

INDUSTRIAL APPLICABILITY

A video recording apparatus and a video reproduction apparatus according to the present invention are useful as a moving image editing apparatus that performs video editing using an inexpensive hard disk or optical disk.

Although the present invention has been described in connection with a specific embodiment, many other variants and modifications as well as other uses will be apparent to those skilled in the art. Therefore, the present invention is not limited to the specific disclosure herein and will be limited only by the appended claims. Note that this application is related to Japanese Patent Application No. 2008-185943 (filed on Jul. 17, 2008), the content of which is incorporated herein by reference.

DESCRIPTION OF REFERENCE NUMERALS

100: MOVING IMAGE RECORDING AND REPRODUCTION APPARATUS
101: RECORDING UNIT
102: VIDEO ENCODING UNIT
103: AUDIO ENCODING UNIT
104: INPUT VIDEO BUFFER
105: INPUT AUDIO BUFFER
106: WRITING UNIT
107: AUDIO DATA WRITING UNIT
108: MULTIPLEXED DATA WRITING UNIT
109: MULTIPLEXING UNIT
110: WRITE CONTROLLING UNIT
111: REPRODUCING UNIT

112: READ CONTROLLING UNIT
113: READING UNIT
114: MULTIPLEXED DATA READING UNIT
115: AUDIO DATA READING UNIT
116: DEMULTIPLEXING UNIT
117: OUTPUT AUDIO BUFFER
118: OUTPUT VIDEO BUFFER
119: AUDIO DECODING UNIT
120: VIDEO DECODING UNIT
121: MULTIPLEXED FILE
122: AUDIO FILE
123: RECORDING MEDIUM
200, 202, and 204: MULTIPLEXED FILE AREA
201, 203, and 205: AUDIO FILE AREA

The invention claimed is:

1. A video reproduction apparatus that reads, from a recording medium that stores a first file having recorded therein video data and a second file having audio data recorded in a physically continuous recording area, the first file and the second file and reproduces video and audio, the video reproduction apparatus comprising:
audio data reading unit for reading the audio data in the second file from the recording medium;
video data reading unit for reading the video data in the first file from the recording medium;
read controlling unit for controlling read operations of the audio data reading unit and the video data reading unit;
audio decoding unit for generating an audio signal from the audio data read by the audio data reading unit;
video decoding unit for generating a video signal from the video data read by the video data reading unit; and
a video buffer that stores the video data obtained by the video data reading unit,
wherein, when the video data reading unit is to read the video data in the first file from the recording medium, the read controlling unit (i) performs read performance evaluation based on an amount of data stored in the video buffer, and (ii) when the amount of data is smaller than a predetermined threshold, controls the video data reading unit to output, to the video buffer, the same video data that was obtained during the last reading of the video data in the first file by the video data reading unit instead of reading new video data from the first file and outputting the new video data to the video buffer.

2. The video reproduction apparatus according to claim 1, further comprising an audio buffer that stores the audio data read by the audio data reading unit,
wherein the read controlling unit controls the audio data reading unit to read the second file from the recording medium while a free space in the audio buffer is greater than or equal to a predetermined value, and reads the first file from the recording medium when the free space in the audio buffer is less than the predetermined value.

3. The video reproduction apparatus according to claim 1,
wherein the video data is recorded to be multiplexed with the audio data in the first file, and the video data reading unit reads the video data and the audio data from the first file,
wherein the video reproduction apparatus is capable of reproducing video and audio from the recording medium at mx speed ($m \leq 1$),
wherein when the video and the audio are reproduced at mx speed, the read controlling unit controls the audio data reading unit not to read the second file from the recording medium, and controls the video data reading unit to read the first file from the recording medium,
wherein the audio decoding unit generates an audio signal from the audio data obtained by the video data reading unit, and
wherein the video decoding unit generates a video signal from the video data obtained by the video data reading unit.

4. A video reproduction method of reading, from a recording medium that stores a first file having recorded therein video data and a second file having audio data recorded in a physically continuous recording area, the first file and the second file and reproducing video and audio, the video reproduction method comprising:
reading the audio data in the second file from the recording medium;
reading the video data in the first file from the recording medium;
controlling read operations in the reading of the audio data and the reading of the video data;
generating an audio signal from the audio data read in the reading of the audio data;
generating a video signal from video data read in the reading of the video data; and
storing the video data obtained in the reading of the video data in a video buffer,
wherein, when the video data in the first file is to be read from the recording medium, the controlling (i) performs read performance evaluation based on an amount of data stored in the video buffer, and (ii) when the amount of data is smaller than a predetermined threshold, controls the reading of the video data to output, to the video buffer, the same video data that was obtained during the last reading of the video data in the first file instead of reading new video data from the first file and outputting the new video data to the video buffer.

5. The video reproduction method according to claim 4, further comprising storing the audio data obtained in the reading of the audio data in a audio buffer,
wherein the controlling controls the reading of the audio data to read the second file from the recording medium while a free space in the audio buffer is greater than or equal to a predetermined value, and controls the reading of the video data to read the first file from the recording medium when the free space in the audio buffer is less than the predetermined value.

6. The video reproduction method according to claim 4,
wherein the video data is recorded to be multiplexed with the audio data in the first file, and at the reading of the video data the video data and the audio data are read from the first file,
wherein the video reproduction method is capable of reproducing video and audio from the recording medium at mx speed ($m \leq 1$),
wherein when the video and the audio are reproduced at mx speed, the controlling controls the reading of the audio data not to read the second file from the recording medium, and controls the reading of the video data to read the first file from the recording medium,
wherein the generating of the audio signal generates the audio signal from the audio data obtained at the reading of the video data, and
wherein the generating of the video signal generates the video signal from the video data obtained at the reading of the video data.

* * * * *